(12) United States Patent
Fritz et al.

(10) Patent No.: US 8,430,545 B2
(45) Date of Patent: Apr. 30, 2013

(54) LIGHTING IN THE EXTERIOR MIRROR

(75) Inventors: Daniel Fritz, Stuttgart (DE); Andreas Herrmann, Winnenden-Baach (DE); Soenke Goldschmidt, Weinstadt (DE)

(73) Assignee: SMR Patents S.a.r.l., Luxembourg (LU)

( * ) Notice: Subject to any disclaimer, the term of this patent is extended or adjusted under 35 U.S.C. 154(b) by 6 days.

(21) Appl. No.: 13/243,303

(22) Filed: Sep. 23, 2011

(65) Prior Publication Data

US 2012/0147617 A1    Jun. 14, 2012

(30) Foreign Application Priority Data

Dec. 10, 2010 (EP) .................................... 10194436

(51) Int. Cl.
*F21V 8/00* (2006.01)

(52) U.S. Cl.
USPC ............................ 362/511; 362/545; 362/555

(58) Field of Classification Search .................. 362/555, 362/559, 545, 543, 544, 511
See application file for complete search history.

(56) References Cited

U.S. PATENT DOCUMENTS

| | | | |
|---|---|---|---|
| 7,160,010 B1 * | 1/2007 | Chinniah et al. | 362/511 |
| 7,357,549 B2 | 4/2008 | Gunther | |
| 7,722,202 B2 * | 5/2010 | Tsurumi et al. | 362/27 |
| 2004/0037087 A1 * | 2/2004 | Desai | 362/511 |
| 2006/0171159 A1 * | 8/2006 | Anderlini | 362/511 |
| 2007/0139946 A1 * | 6/2007 | Basile et al. | 362/511 |
| 2007/0193085 A1 | 8/2007 | Sullivan et al. | |
| 2008/0089080 A1 * | 4/2008 | Kawaji et al. | 362/494 |

FOREIGN PATENT DOCUMENTS

| | | |
|---|---|---|
| DE | 10243373 | 5/2003 |
| DE | 102004024599 | 12/2005 |
| DE | 102005038154 | 2/2007 |
| EP | 1176360 | 1/2002 |
| EP | 1176361 | 1/2002 |
| EP | 1690736 | 8/2006 |
| EP | 0858932 | 8/2008 |
| WO | 2006079947 | 8/2006 |

OTHER PUBLICATIONS

European Search Report for application No. EP 10 19 4436 dated Apr. 20, 2011.

* cited by examiner

*Primary Examiner* — Laura Tso
(74) *Attorney, Agent, or Firm* — Reising Ethington PC

(57) ABSTRACT

A lighting module for a vehicle is suggested, consisting of a housing and at least two light conductors or light conductor sections, which are arranged in the housing and extend along the external contour of the lighting module, with at least two LEDs, which are arranged on at least one circuit board in the housing. The light of at least two LEDs is coupled into the at least two light conductors, and a connection lens, which is adapted to the external contour of the light conductor, is installed between the light conductor sections.

14 Claims, 3 Drawing Sheets

LIGHTING IN THE EXTERIOR MIRROR

The invention is based on a priority patent application EP 10194436.1 which is hereby incorporated by reference.

BACKGROUND ART

1. Field of the Invention

A lighting unit is suggested for a vehicle, whereby a part of the lighting is supplemented by a connection lens.

Indicators in the exterior mirror are particularly considered.

2. Description of the Related Art

Conventional exterior mirrors have a design allowing the mirror head to be folded backwards in relation to the mirror base, by hand or driven by a motor, in the direction of movement of the vehicle. In addition, the mirror glass bracket can normally be positioned in the mirror head from the inside of the vehicle. A perfect view is thus ensured for the driver, which results in better road safety. Many exterior mirrors comprise an indicator, which is provided on the front side of the mirror housing in the direction of movement. For road users who are next to or behind the exterior mirror, the indicator can generally not be seen, or only insufficiently. Additional LEDs are therefore used, which radiate along the direction of travel, and are integrated on the outermost edge of the exterior mirror in the indicator.

According to ECE regulations, an additional flashing light in the exterior mirror should light up a region beginning from 5° from the longitudinal axis of the vehicle, up to 60° to the longitudinal axis of the vehicle in the opposite direction of movement.

A variety of solutions for indicators in the exterior rear view mirror is known from the prior art. Indicator modules are integrated into the housing of an exterior mirror in the process. According to the design, these indicator modules contain optical fibers, reflectors, printed circuit boards, lenses and cover glass and illuminants. LEDs are increasingly used as illuminants due to the known advantages.

An embodiment is known in EP 0858932. In this embodiment, an indicator module is formed, which comprises a light conductor. The light conductor forms a constant contour with the housing of an exterior mirror. The light of an LED is coupled at an end of the light conductor, and transported over the whole length. The radiation of the light takes place over the whole length of the light conductor according to the thickness of the decoupling devices and at the end of the light conductor. It is proved that this solution is insufficient for the optimal illumination of a lighting device. One does not achieve the desired light intensity with the solution of the remote coupling of light, and the transport of 5 to 20 cm.

A lighting unit is known in U.S. Pat. No. 7,357,549, which includes a light conductor element, into which at least one LED protrudes. In this design, the light conductor is divided into several sections, and comprises a recess along its longitudinal extension. Due to the recess in the light conductor, the latter is weakened in its stability, and/or the external constant surface of the light conductor is disturbed by an elevation. Since the light conductor material is optically clear, the light coupling point can be seen from the outside, which disturbs the harmonic impression of the light conductor.

A brake light is known in DE102005038154, whose light conductor sections are partly connected to an optical element.

SUMMARY OF THE INVENTION

The object of the invention is to create an indicator module, in which the light is stored in at least two light conductor sections and the contact region of the light conductor is closed to the outside with a lens, which covers the coupling point on one side, and on the other side, provides added value with a decorative effect.

BRIEF DESCRIPTION OF THE DRAWINGS

The subsequent figures and description show embodiments of the invention.

DETAILED DESCRIPTION OF THE DRAWINGS

Figure 1:
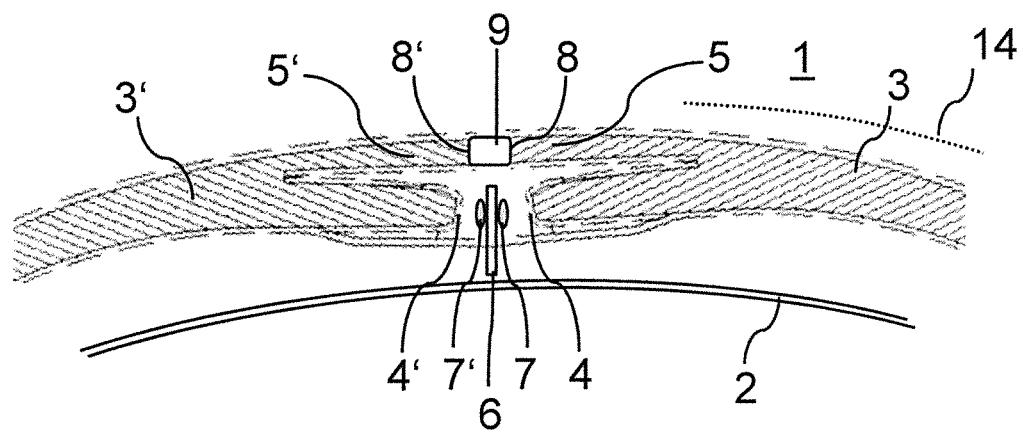
FIG. 1 shows a first embodiment of a lighting module.

FIG. 1 shows an embodiment of a lighting module, which is not shown completely. The lighting module 1 consists of light conductors 3, 3', as well as a housing 2, whose rear panel is shown in the drawing. In an embodiment, the light conductors form the external contour 16 of the lighting module, or lie behind a light disc 14 in another embodiment. They also follow the contour of the light disc 14. In the selected embodiment, the light conductors 3 and 3' comprise two arms. The one internal arm of the light conductor ends in a coupling point 4 or 4'. The external arm 5, 5' of the light conductor ends bluntly on a connection lens 9. The connection lens 9 sits exactly between both end facets 8, 8' of both light conductors 3 and 3'. In this embodiment, both arms of the light conductor are not designed in equal length. In fact, the internal arms form a space with the coupling arms 4, 4', into which space protrudes a circuit board 6, which is loaded with LEDs 7, 7'. In this embodiment, the connection lens is a cuboid, which fits exactly into the recess of the external arms 5, 5' of the light conductors. This cuboid of the connection lens covers the coupling point, the coupling space underneath the connection lens. In order to conceal the insight into the coupling point and the circuit board, the connection lens 9 is here designed as opaque material. The light of the LEDs 7 and 7' is coupled in coupling points 4, 4' in the light conductors 3, 3' and transported to the respective decoupling points. In the process, light is emitted via the external contour 16 of the optical fiber, as well as via the decoupling points, which are not shown in these drawings.

Figure 2:
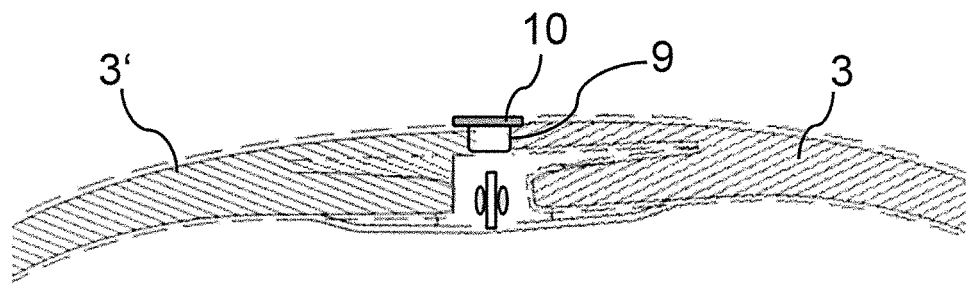
FIG. 2 shows a second embodiment

FIG. 2 shows a further embodiment of the connection lens according to the invention. On the left side of the lighting module, an optical fiber 3' is shown, which does not consist of two arms. The light conductor has a complete structure. In this execution example, the connection lens 9 is supplemented by information lens 10. The information lens 10 consists of a colored material, for example, which either completely covers the connection lens, or of a colored material, which covers the connection lens only with a logo or a sign. The information lens 10 can consist of an opaque disc. Also in this execution example, the light of both LEDs, marked 7 and 7' for example, is emitted in the direction of the optical fiber. It is also possible to provide a further LED, whose light shines through the connection lens. An embodiment of this type is particularly advantageous for the representation of a logo.

Figure 4:
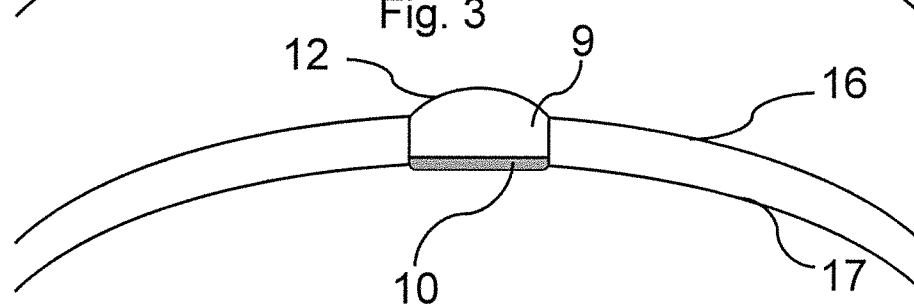
Figure 5:
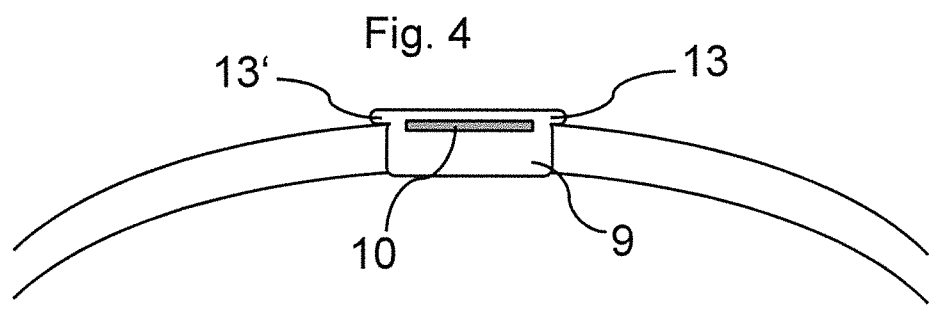
Figure 6:
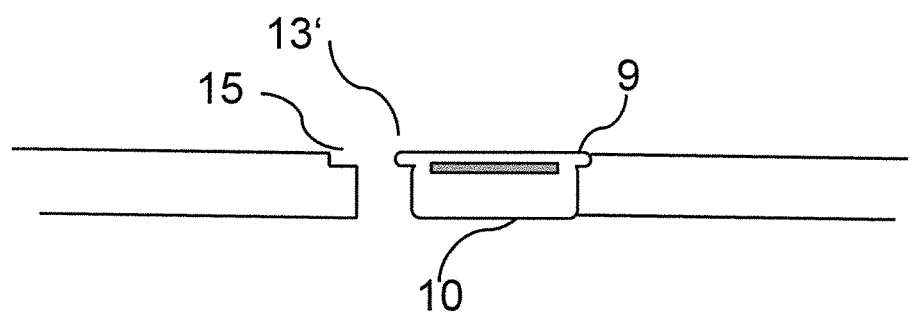
FIG. 6 shows an attachment possibility

As shown in FIGS. 4 and 5, it is not mandatory for the connection lens 10 to be attached to the external contour 6 of the light conductor. In the embodiment in FIG. 4, the information lens is provided on the side of the internal contour of the optical fiber. In the embodiment according to FIG. 4, the connection lens also comprises a convex surface on its external side. Through this, a lens structure is formed, which facilitates a clean picture of the logo, which is situated in the information lens 10. The illumination of the logo, which is situated in the information lens 10, takes place directly through the optical fiber 5, 5'. It is not mandatory for the sign or logo of the information lens to be illuminated from behind. In the embodiment in FIG. 5, the information lens is incorporated into the connection lens. For all embodiments, it is possible to design the external sides as convex lenses in each case. The embodiment according to FIG. 5 shows yet another special design. The connection lens 9 comprises overhanging edges 13, 13' on its external side. These edges overhang the light conductors 5, 5'. The overhanging edges 13 and 13' here serve for attachment of the connection lens 9 to the light conductors 5, 5'. As shown in FIG. 6, it is also possible to insert the overhanging edges directly into the recesses 15 of the optical fiber, and thus produce a flush surface.

The attachment means here include all means, which are used for gluing, ultrasonic welding, friction welding, as well as other forms of heat bonding. The attachment means are also to be understood as surfaces, which are suitable for adhesion.

Figure 3:
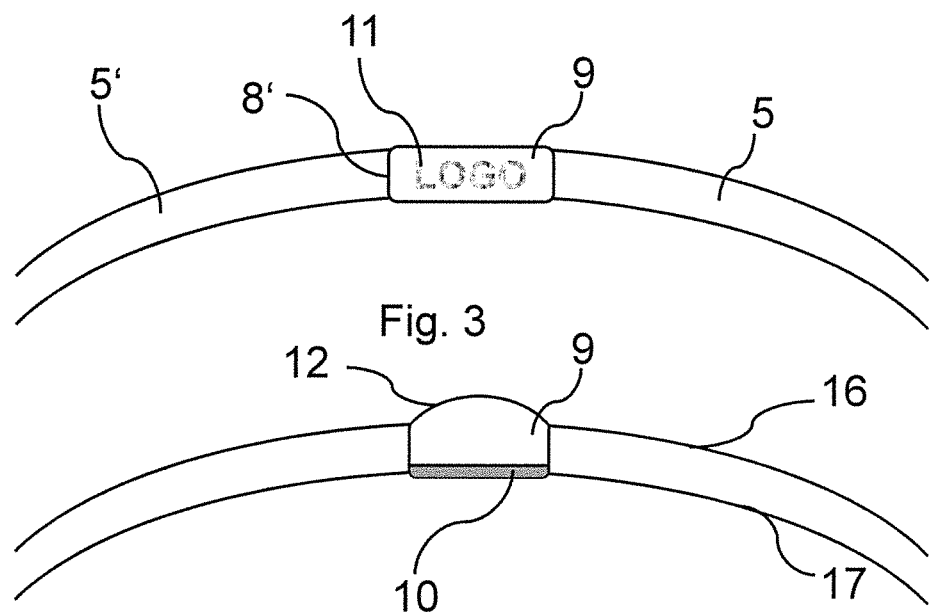
FIGS. 3 to 5 show examples of the logo lighting

A special embodiment is shown in FIG. 3. In this embodiment, a sign 11 is inscribed in the connection lens 9. For this, a special plastic is used, so that a sign can be inscribed by a laser.

Plastics do not absorb any laser radiation in the region of near-ultra-violet to near-infra-red light. A transformation of laser energy into heat is therefore only possible if the polymer has accordingly been 'laser sensitized' by the addition of an additive. Without a laser additive, plastics can therefore only be processed in far ultra-violet light, e.g. with Excimer lasers, and in far infra-red light e.g. with CO2 lasers.

In standard acrylic glass, 3D motifs such as logos can be engraved by lasers; however, the resolution and brilliance are clearly worse than in silica glass. Up to now, the low quality of the engraving has prevented the use of acrylic glass for laser engraving. Producing 3D motifs with higher quality laser engraving has been successful by means of using special plastics or additives. This is achieved by nano-modification of the highly transparent plastics. The distribution required for the nano-modification is the prerequisite for obtaining high transparency of the plastic, and for creating an image with higher resolution and brilliance.

A very high resolution is achieved in nano-modified acrylic glass. Whilst optically and mechanically disruptive microscopic cracks develop in non-modified acrylic glass in laser engraving, in contrast, defined 'dots' are generated in nano-modified acrylic glass. The possibility of engraving high resolution 3D motifs in components does not exist only for acrylic glass, but can also be used for other highly transparent materials such as partially crystalline polyamide. The object from the CAD data must be converted into a so-called 'dot cloud'. In the process, each dot is calculated and stored with its x, y and z coordinates. In contrast to normal writing lasers, the 3D laser can only inscribe individual dots, but with a very high speed.

Each dot is then engraved into the transparent polymer by a high-focused, frequency-doubled Nd:YAG Laser (532 nm). In PMMA, the tiniest bubbles are created in this process, whilst there is carbonization (blackening) of the plastic in PA.

The laser beam is deflected by two computer controlled galvanometer reflectors in x, y and z direction, and focused on the part to be labeled by a (preferably flat field) lens.

In all embodiments according to FIGS. 3-6, the light of the LEDs is coupled directly into the optical fiber 5, 5'.

Figure 7:
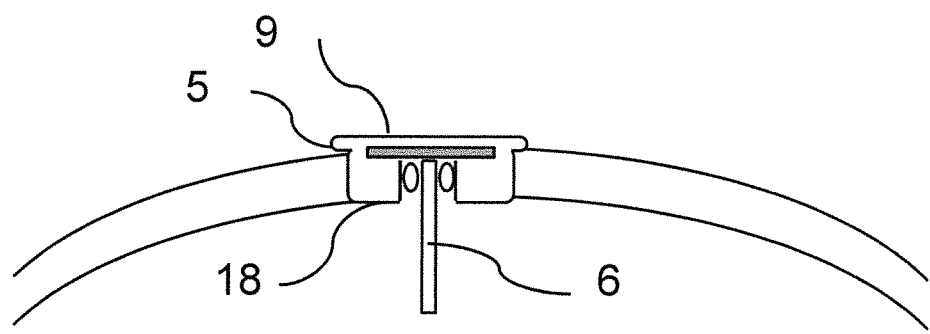
FIG. 7 shows a decoupling in the connection lens

An embodiment is found in FIG. 7, in which the light is directly coupled into the connection lens. For this purpose, the connection lens 9 comprises a recess 18, into which protrudes the circuit board 6, with the LEDs mounted thereon. Connecting means are provided in order to assemble the connection lens between the light conductor sections. Different connection possibilities are used here. A simple connection takes place by sticking the connection lens and light conductors together. However, if one wishes to couple light from the optical fibers into the connection lens, the glue joints of the end facets of the light conductor to the connection points must be visually transparent. It is also possible to press the connection lens 9 in between the light conductor sections, or to connect it to the light conductors by means of friction welding. Any type of clip connection is also possible. In the process, the connection lens can be pushed between the light conductors from the external sides of the external contour, and clipped there. A further advantage is also linked to the embodiment in FIG. 7. Here, the connection lens 9 is integrated into a combined independent module with the circuit board 6, LEDs 7 and the information lens 10. Light conductor sections can therefore be connected together by the connection lens being inserted from the outside between the opening of the light conductors. In the process, the contacting of the circuit board takes place by means of plugs or wire connections to the rear side of the lighting housing.

The embodiments shown are preferably used as indicator modules in an exterior mirror of a vehicle. The lighting unit can also be used in other positions in the vehicle.

Legend
1 Lighting module
2 Housing rear panel
3 Light conductor
4 Coupling point
5 Light conductor arm
6 Circuit board
7 LED
8 Light conductor end facet
9 Connection lens
10 Information lens
11 Inscribed sign
12 Lens
13 Overhanging edge
14 Light disc
15 Acceptance
16 Exterior contour
17 Interior contour
18 Recess in the connection lens

The invention claimed is:

1. Lighting module for a vehicle, consisting of a housing and at least two light conductors or light conductor sections, which are arranged in the housing and extend along the external contour of the lighting module, with at least two LEDs, which are arranged on at least one circuit board in the housing, whereby the light of at least two LEDs is coupled into the at least two light conductors, wherein a connection lens being situated between the light conductor sections, which extends between two end facets of the at least two light conductors with an information lens, and which is adapted to the external contour of the light conductor.

2. Lighting module according to claim 1, characterized in that the light conductors form the external cover of the housing of the lighting fixture.

3. Lighting module according to claim 1, characterized in that the light conductors lie within a further external cover of the housing of the lighting fixture.

4. Lighting module according to claim 1, characterized in that the light conductors end bluntly on the connection lens.

5. Lighting module according to claim 1, characterized in that the connection lens is made from the same plastic material as the light conductors.

6. Lighting module according to claim 1, characterized in that the connection lens is made from plastic material different to that of the light conductors.

7. Lighting module according to claim 1, characterized in that the connection lens comprises the information lens on its external surface.

8. Lighting module according to claim 1, characterized in that the connection lens comprises the information lens in its inside.

9. Lighting module according to claim 1, characterized in that the connection lens includes information lasered in the inside.

10. Lighting module according to claim 1, characterized in that the connection lens comprises a lens shape on its external surface.

11. Lighting module according to claim 1, characterized in that the connection lens comprises an edge overhanging the light conductor on one of its external sides.

12. Lighting module according to claim 1, characterized in that the connection lens comprises means for attachment to the light conductors.

13. Lighting module according to claim 12, characterized in that the means consist of clips.

14. Lighting module according to claim 1, characterized in that the light conductors comprise attachment means for the connection with the connection lens.

\* \* \* \* \*